July 13, 1965
B. STEVERDING ETAL
3,194,059
VACUUM FATIGUE APPARATUS
Filed Sept. 19, 1961
3 Sheets-Sheet 1
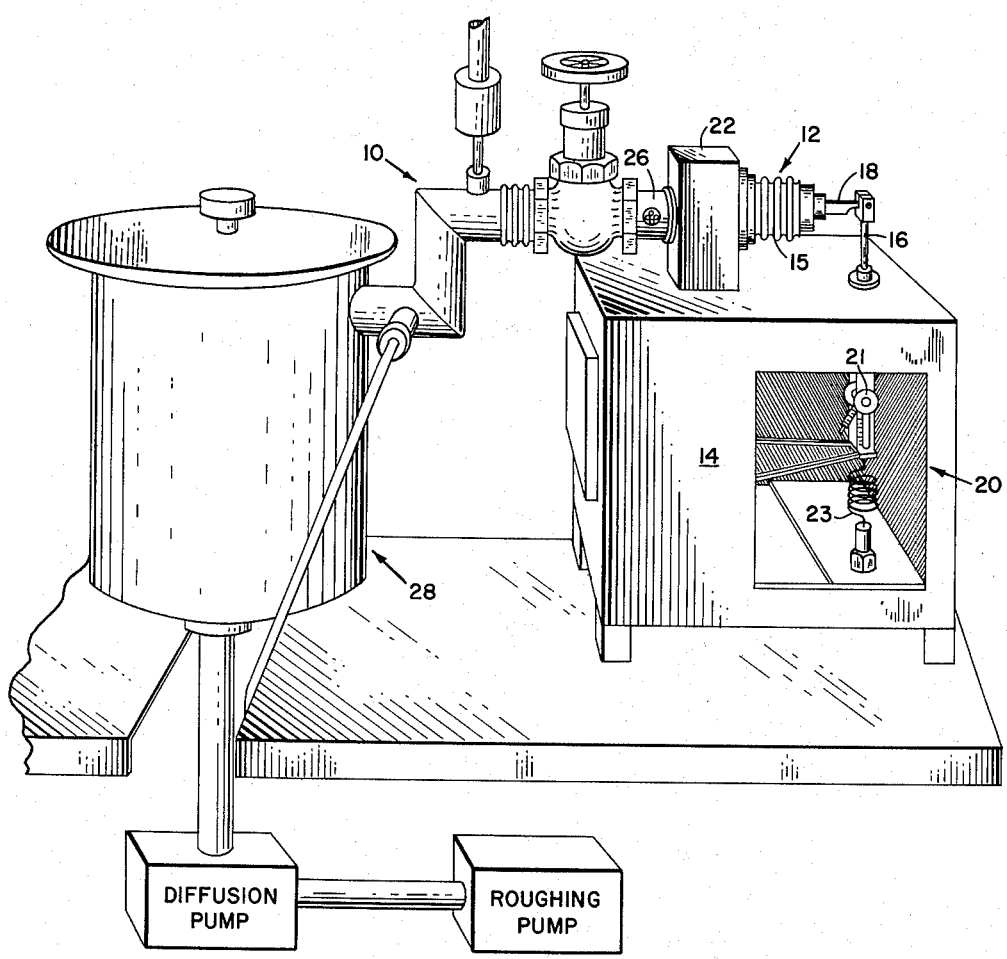
FIG. I
Bernard Steverding
Donald L. Turpen,
INVENTORS.
BY

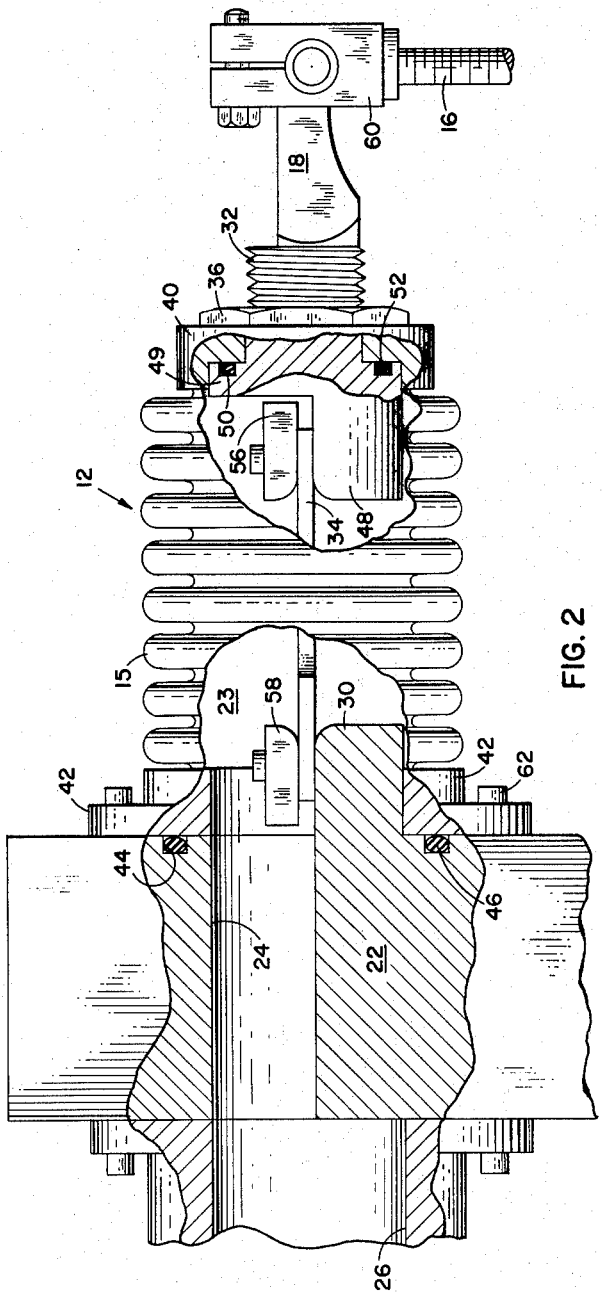

Bernard Steverding
Donald L. Turpen,
INVENTORS.

United States Patent Office 3,194,059
Patented July 13, 1965

3,194,059
VACUUM FATIGUE APPARATUS
Bernard Steverding, Huntsville, Ala., and Donald L. Turpen, Fayetteville, Tenn., assignors to the United States of America as represented by the Secretary of the Army
Filed Sept. 19, 1961, Ser. No. 139,320
2 Claims. (Cl. 73—67.3)
(Granted under Title 35, U.S. Code (1952), sec. 266)

The invention described herein may be manufactured and used by or for the Government for governmental purposes without the payment of any royalty thereon.

This application pertains to an apparatus for fatigue testing a specimen in a vacuum and more particularly, to apparatus provided with a vacuum chamber disposed to inclose a specimen therein to subject the specimen to a constant load and to fatigue test the specimen at varying stresses of any desired frequency.

In conventional fatigue testing, a specimen is subjected to periodically varying stresses by means of mechanical or magnetic devices. Usually, fatigue tests are made on specimens of material on machines respectively capable of providing limited ranges of stress levels to determine the level at which the material may be expected to rupture.

Furthermore, conventional apparatus usually includes a pulsating magnetic field which initiates a vibratory motion of a magnetic hammer in the vacuum chamber in which the specimen is located. The chambers of such devices include large airgaps that permit only relatively small forces to be transmitted to test specimens and therefore the specimens can be tested in each machine at a limited range of stress level only and at the natural frequencies of the vibrating system.

Conventional vacuum testing devices are not equipped to accomplish fatigue testing of specimens under constant load. Furthermore in conventional vacuum fatigue testing, amplitude of the applied stress is very critical and expensive complicated electric servo systems are required to control the amplitude of the stress.

It is, therefore, an object of our invention to provide an apparatus with a vacuum chamber to fatigue test a specimen therein.

A further object of our invention is to provide such an apparatus to fatigue test specimens under constant load.

A still further object of our present invention is to provide such an apparatus for application of such stresses to a specimen at any desired frequency.

The apparatus of our invention provides a vacuum chamber attachment for use with universal fatigue testing devices. Such Universal machines are similar to the Baldwin-Lima-Hamilton Universal Fatigue Testing Machine developed and built by Sonntag Scientific Corporation. Another such machine is known as the Schenck Fatigue Testing Machine built in Darmstadt, Germany and distributed in the United States by the Cosa Corporation of New York. Both Sonntag and Schenck machines may be modified to receive a vacuum chamber for fatigue testing specimen in a controlled vacuum. The vacuum chamber is enclosed by a bellows casing and a conduit communicates between the casing and the vacuum producing apparatus for evacuation of air from the chamber.

The specimen is disposed within the casing and supported therein by a pair of support members, one of which is releasably secured to a vibration producing device for transmission of the stresses to the specimen for the fatigue testing thereof.

Other objects and advantages of our invention will become more fully apparent from the following description and the accompanying drawings in which:

FIGURE 1 is a pictorial view of the fatigue testing apparatus of our invention.

FIGURE 2 is an elevational view, partly in section, of the vacuum chamber attachment with the specimen therein shown in testing position.

FIGURE 3 is a fragmentary plan view of the specimen and support members.

Figure 5:
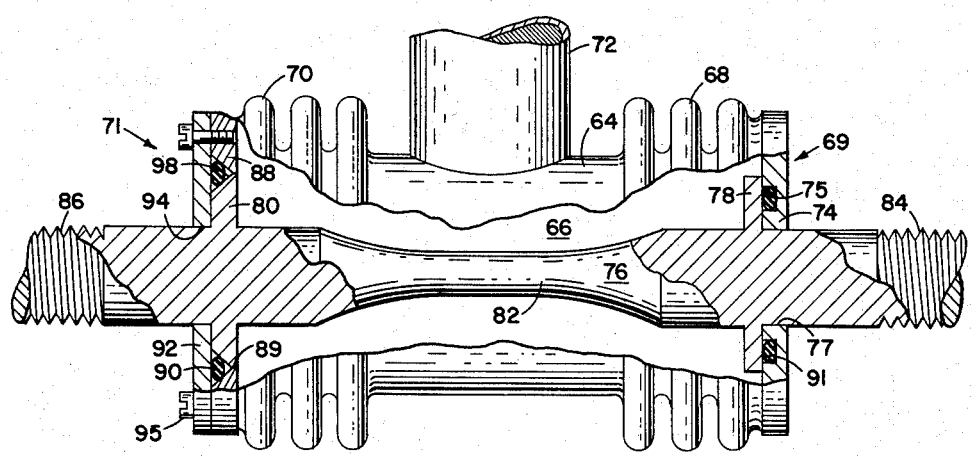
FIGURE 5 is an elevational view, partially in section, of the vacuum chamber attachment of the alternate embodiment of our invention and showing the specimen in testing position.

In one embodiment of our invention, shown in FIGURE 1, a universal fatigue testing machine 10 is provided with a vacuum attachment 12 to permit flexure tests of a specimen in reduced pressures. A vibration producing device 14 includes a rod 16 secured to a flexure arm 18. The vibration producing device 14 is provided with mechanical loading device 20 for control of amplitude. The mechanical loading device 20 is disposed for constant load testing for bending deflection. To achieve this testing the loading device includes an eccentric weight 21 disposed for rotation at constant r.p.m. The sinusoidal centrifugal force is transmitted to the specimen through rod 16 and arm 18. The rotating shaft carrying the eccentric weight is spring-loaded by a spring 23 to smooth out the force cycles. This structure is included in the conventional Sonntag Fatigue Tester, discussed supra, and illustrated in the embodiment of FIGURES 1–3.

A block member 22 is secured atop device 14 and provided with an attached cylindrical bellows casing 15.

An aperture 24 (FIGURE 2) extends through block 22 and communicates with a test chamber 23 of the bellows casing 15. A conduit 26 is attached to one side of block 22 and communicates with aperture 24 and with a device 28 for evacuation of air from the chamber.

A semi-circular beam 30 (FIGURE 2) extends from one end of aperture 24 of block 22 and protrudes into the one end of casing 15 and serves as a specimen holder to support the specimen at one end.

A flexure arm 18 extends into the bellows casing 15 for releasable attachment of the opposite end of specimen 34. Flexure arm 18 includes a portion 32 provided with external threading located intermediate the ends of arm 18.

An outer flange 40 and an inner flange 42 are secured to opposite ends of the bellows casing 15. The inner flange 42 is disposed to be drawn against block 22 which is provided with an annular groove 44 into which an O-ring 46 is seated. The flange 42 engages O-ring 46 to seal the chamber at this end.

Flange 40 is secured to casing 15 and disposed to abut against a flange 49, integral with member 18 and located adjacent threaded portion 32 of member 18. Flange 49 is provided with an annular groove 50 into which an O-ring 52 is positioned. A nut 36 engages portion 32 for engagement of outer flange 40 with flange 49 to complete the chamber seal.

A lip 48 integral with flange 49 and longitudinally extending therefrom is disposed to have a plate 56 attached thereto with one end of specimen 34 disposed between the plate and the lip to permit releasable attachment of specimen 34 and flange 49. Specimen 34 is secured at its other end between beam 30 and an upper plate 58 in a similar manner.

To permit stresses to be imparted to the specimen, flexure arm 18 is pivotally secured to a connecting member 60 which is in turn secured to threaded rod 16. Member 60 is adjustable on rod 16. Rod 16 (FIGURE 1) extends into vibration producing device 14 and coacts therewith to transmit the vibratory movement to specimen 34.

In operation, specimen 34 is secured between support members 30 and 18 and bellows casing 15 is placed over the specimen and support members to be secured to block member 22 by means of screws 62 extending through inner flange 42 and into block 22. Nut 36 is then screw threaded on portion 32 of flexure arm 18 to secure casing 15 against flange 49.

Vibration producing device 14 (FIGURE 1) is then actuated to the desired frequency and the vibrations are transmitted from device 14 through rod 16 and support member 18 to specimen 34. Because members 18, 16 and the bellows casing 15 are rigidly secured together, the bellows is also made to oscillate. Therefore, the specimen can be tested under constant load at the desired frequency.

Furthermore, bellows 15 absorbs the high amplitudes which occur at fracture of the specimen. The bellows may be of stainless steel or brass.

To permit the load settings of the apparatus to be calibrated, electrical strain gages are attached to the specimen.

The vacuum system utilized in the invention is comprised of a roughing pump, an oil diffusion pump, a trap and appropriate vacuum gages. Such a system is capable of maintaining pressures in the range of 10–7 mm. of mercury.

In an alternate embodiment of our invention an axial loading, tension-compression machine 63 is provided with a vibration producing device 61 and a vacuum attachment 12 to permit vacuum testing of a specimen therein. Machine 63 is the Schenck Fatigue Testing Machine, discussed supra, and is similar to the Dynamic Material Testing Machine disclosed in the patent to K. Federn, Patent Number 2,778,222, filed May 19, 1954.

This machine operates at speeds between 2000 and 4000 cycles per minute, depending upon the specimen material and the magnitude of the dynamic load.

Figure 4:
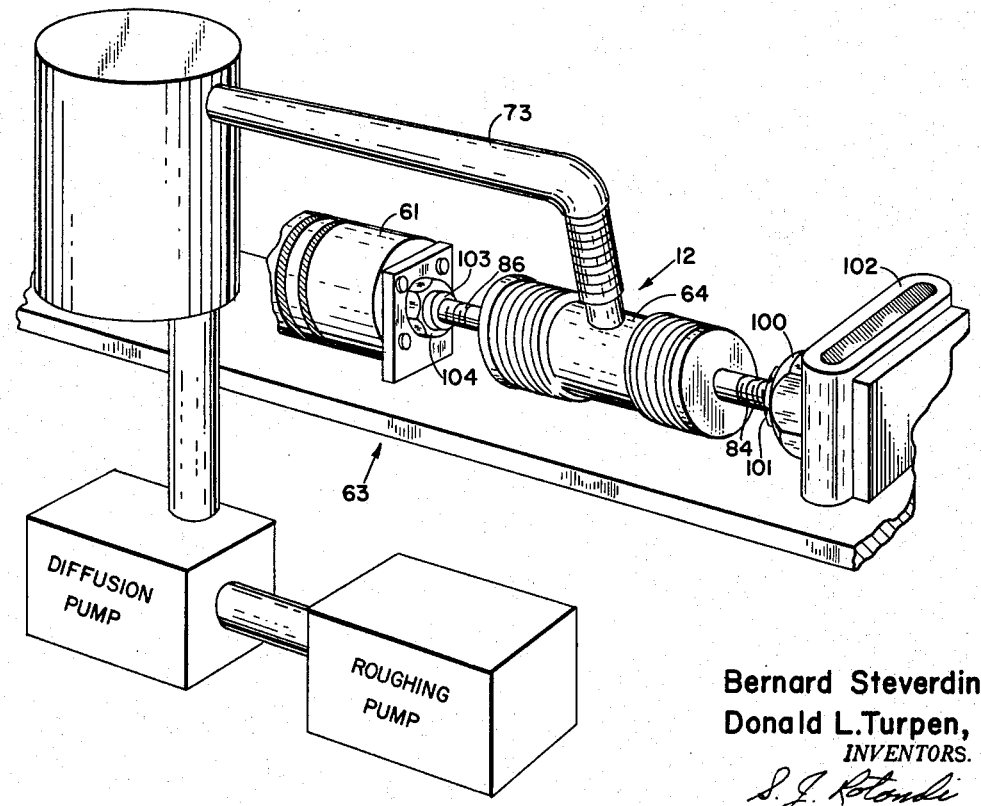
FIGURE 4 is a pictorial view illustrating the apparatus of an alternate embodiment of our invention.

The apparatus of the alternate embodiment of our invention includes a casing 64 to enclose a test chamber 66. Casing 64 is in the form of a T and provided with bellows-like portions 68 and 70 at opposite ends 69 and 71 thereof. Leg portion 72 of the T is secured to a conduit 73 (FIGURE 4) which communicates with the vacuum producing device for evacuation of air from test chamber 66.

The casing is provided at end 69 with an end plate 74 having an annular groove 75 disposed on the inner surface thereof. Plate 74 is further provided with an aperture 77 extending axially therethrough.

Specimen 76 includes a pair of flanges 78 and 80 at opposite ends of a middle recessed portion 82 and a pair of threaded end portions 84 and 86 outwardly extending from the flanges 78 and 80, respectively. Flange 80 is bevelled at its outermost projecting portion.

Bellows casing 64 includes an annular shoulder 88 at end 71 of the casing. The shoulder protrudes into the chamber to form an opening 89 therein. The shoulder is annularly bevelled at its innermost projecting point.

In operation, the specimen is inserted into the chamber so that the threaded end 84 of the specimen extends through aperture 77 of end plate 74, and flange 78 of the specimen abuts against the inner surface of end plate 74 to compress an O-ring 91 positioned in annular groove 75 of plate 74 and seal the chamber at end 69 thereof.

Once the specimen is in the above described position, bevelled shoulder 88 of the belows and bevelled flange 80 of the specimen are in mating contact and the bevelled portions of each form a groove 98 into which an O-ring 90 is placed.

A second end plate 92 having an aperture 94 therethrough is then placed around the specimen so end 86 thereof extends through the aperture 94 of end plate 92. Plate 92 is moved into abutting relationship with flange 80 of the specimen and shoulder 88 of the chamber 64 to compress O-ring 90 into groove 98. A plurality of screws 95 are inserted through the plate for threaded engagement with shoulder 88 of casing 64 to permit enclosure of the chamber.

Threaded ends 84 and 86 of the specimen is disposed for respective threaded engagement with a pair of members 101 and 103, respectively disposed on a stationary resilient support bracket 102 and the vibration producing device 61 of machine 63. Members 101 and 103 are provided with internal threads for threaded engagement with the threaded ends 84 and 86, respectively, of the specimen. Each of the members 101 and 103 is provided with an outwardly extending flange (not shown) which is positioned in an annular opening in members 100 and 104. Members 100 ad 104 are provided with internal threading for threaded engagement with an externally threaded stub shaft extending from vibration device 61 and 102 partially into members 100 and 104.

The specimen is then loaded under either tension or compression loading and device 104 is actuated, subsequent to evacuation of air from chamber 66, to induce axial stresses of the desired frequency to the specimen for fatigue testing thereof.

The apparatus of our invention has provided a means to investigate the influence of reduced pressures on the fatigue properties of various metals. Investigation of various metals has indicated that the fatigue life of some metals can be enhanced by the reduction of oxygen in the testing environment. The rate of crack propagation is substantially reduced in vacuum due to the reduction of oxide film formation of the crack walls or oxygen diffusion at the crack tip.

While the foregoing is a description of the preferred embodiments of the present invention it is to be understood that various modifications thereof may be resorted to that is within the scope of the appended claims.

We claim:

1. Apparatus for fatigue testing a specimen in a vacuum environment comprising: a flexible casing forming a chamber for enclosing a specimen therein; a pair of support means respectively secured to opposite ends of said casing for support of said specimen therein, one of said support means extending out of said casing and forming a fixed support for the end of said casing attached thereto, the second support means extending through the end of the casing to which it is secured, said one of said support means including a block having said casing secured thereto and a beam extending from said block and into said chamber for support of the specimen at one end thereof, said block provided with an aperture extending therethrough in communication with said chamber, a vacuum producing device connected in communication with said aperture for evacuation of air from said chamber; the second of said support means including an arm extending into said casing for support of said specimen at the other end thereof, said arm provided with a threaded portion intermediate the ends thereof, an internally threaded member disposed for threaded engagement with said intermediate portion of said arm to secure said casing thereon, a rod having one end thereof pivotally secured to said arm, a vibration producing device connected to the other end of said rod to transmit periodic stresses to said specimen responsive to actuation of said vibration producing device.

2. Apparatus for fatigue testing a specimen in a vacuum environment comprising: a flexible casing having bellows portions and an intermediate connecting portion, said casing disposed for enclosing said specimen therein, said specimen including a recessed intermediate portion and a pair of oppositely extending threaded end portions and a flange adjacent each end portion, an end plate secured at opposite ends of said casing in abutting relation with said flanges of said specimen, a pair of O-ring seals each respectively disposed between said end plates and said flanges, an inwardly protruding annular shoulder disposed at one end of said casing and adjacent one of said flanges, said shoulder and said flange having oppositely bevelled surfaces to form a groove therebetween, one of said O-rings disposed within said groove for sealing said chamber, a resilient support member connected to one of said threaded ends of said specimen, a vibration producing device connected to the other said threaded end of said specimen to transmit periodic stresses to said specimen, a vacuum producing device connected to said intermediate connecting portion of said casing for evacuation of said chamber.

References Cited by the Examiner

UNITED STATES PATENTS

| | | | |
|---|---|---|---|
| 1,652,525 | 12/27 | Hahnemann et al. | 73—92 X |
| 2,007,286 | 7/35 | Schopper | 73—100 X |
| 2,748,597 | 6/56 | Kooistra | 73—103 X |
| 2,778,222 | 1/57 | Federn | 73—92 |
| 3,027,757 | 4/62 | Achter et al. | 73—67.4 |

RICHARD C. QUEISSER, *Primary Examiner.*

JOHN P. BEAUCHAMP, *Examiner.*